United States Patent
Jeuk

(10) Patent No.: US 12,052,229 B2
(45) Date of Patent: Jul. 30, 2024

(54) SECURE FRAME ENCRYPTION AS A SERVICE

(71) Applicant: Cisco Technology, Inc., San Jose, CA (US)

(72) Inventor: Sebastian Jeuk, Munich (DE)

(73) Assignee: Cisco Technology, Inc., San Jose, CA (US)

( * ) Notice: Subject to any disclaimer, the term of this patent is extended or adjusted under 35 U.S.C. 154(b) by 37 days.

(21) Appl. No.: 17/389,708

(22) Filed: Jul. 30, 2021

(65) Prior Publication Data
US 2023/0030403 A1 Feb. 2, 2023

(51) Int. Cl.
| | |
|---|---|
| H04L 29/06 | (2006.01) |
| H04L 9/40 | (2022.01) |
| H04L 69/324 | (2022.01) |
| H04L 9/30 | (2006.01) |
| H04L 29/12 | (2006.01) |

(52) U.S. Cl.
CPC ........ H04L 63/0471 (2013.01); H04L 63/02 (2013.01); H04L 63/029 (2013.01); H04L 69/324 (2013.01)

(58) Field of Classification Search
CPC ... H04L 63/0471; H04L 63/02; H04L 63/029; H04L 69/324
See application file for complete search history.

(56) References Cited

U.S. PATENT DOCUMENTS

| | | | |
|---|---|---|---|
| 9,009,466 B2 * | 4/2015 | Li | H04L 63/162 |
| | | | 713/160 |
| 10,645,430 B2 * | 5/2020 | Dorwin | H04L 47/805 |
| 2005/0163316 A1 | 7/2005 | Wing | |

(Continued)

FOREIGN PATENT DOCUMENTS

| | | | |
|---|---|---|---|
| EP | 1916818 A2 | 4/2008 | |
| WO | 2017083980 A1 | 5/2017 | |
| WO | WO-2017083980 A1 * | 5/2017 | ........... G08B 13/196 |

OTHER PUBLICATIONS

Cheng Jie, Cao Jiuxin, Lin Jiazhen, Liu Bo; "A Protection Scheme Based on Online Encryption for Streaming Media"; 2008 First IEEE International Conference on Ubi-Media Computing; Apr. 2008; Conference Paper; Publisher: IEEE; pp. 165-170 (Year: 2008).*

(Continued)

*Primary Examiner* — Fatoumata Traore
*Assistant Examiner* — Courtney D Fields
(74) *Attorney, Agent, or Firm* — Polsinelli P.C.

(57) ABSTRACT

Systems, methods, and computer-readable media are provided for performing secure frame encryption as a service. For instance, a network device can receive a first request for encrypting a first media stream associated with a first endpoint. In response to the first request, the network device can obtain a first encryption key for encrypting the first media stream associated with the first endpoint. The network device can receive, from the first endpoint, a first plurality of media frames corresponding to the first media stream and encrypt each of the first plurality of media frames using the first encryption key to yield a first plurality of encrypted media frames. The network device can packetize the first plurality of encrypted media frames into a first plurality of data packets for transmission to a second endpoint.

20 Claims, 10 Drawing Sheets

(56) References Cited

U.S. PATENT DOCUMENTS

| | | | |
|---|---|---|---|
| 2010/0034391 A1* | 2/2010 | Yamagishi | G06F 21/10 |
| | | | 380/278 |
| 2011/0093609 A1 | 4/2011 | Blom et al. | |
| 2014/0136853 A1* | 5/2014 | Fukuda | H04L 63/205 |
| | | | 713/189 |
| 2016/0269365 A1* | 9/2016 | Reddy | H04L 9/0822 |
| 2017/0054697 A1* | 2/2017 | Zhang | H04N 21/2347 |
| 2017/0104596 A1* | 4/2017 | Herrero | H04L 9/065 |
| 2017/0195718 A1 | 7/2017 | Nair et al. | |
| 2019/0320014 A1 | 10/2019 | Allen et al. | |

OTHER PUBLICATIONS

Omara et al.; Secure Frame (SFrame); Network Working Group; Mar. 29, 2021.

International Search Report and Written Opinion for the PCT Application No. PCT/US2022/074300, issued on Oct. 26, 2022, 9 pages.

\* cited by examiner

SECURE FRAME ENCRYPTION AS A SERVICE

TECHNICAL FIELD

The subject matter of this disclosure relates in general to the field of computer networking, and more particularly, to systems and methods for providing secure frame encryption as a service for securing audio and video streams.

BACKGROUND

Wireless communications systems and computer networks are deployed to provide various telecommunications and data services, including telephony, video, data, messaging, and broadcasts. For example, computing devices such as smartphones, laptops, tablets, etc. can be configured to perform real-time audio and video conferencing. However, the proliferation of audio and video conferencing applications that are often used to conduct business and/or communicate sensitive information can pose privacy concerns.

Although certain encryption techniques can be used to help secure audio and video streams, vulnerabilities remain in multi-hop environments that include, for example, one or more media servers. Furthermore, while the secure frame encryption algorithm addresses such vulnerabilities, its implementation requires devices to perform complex tasks that could be beyond the capabilities of the device and/or could hinder device performance by unduly burdening the processor.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
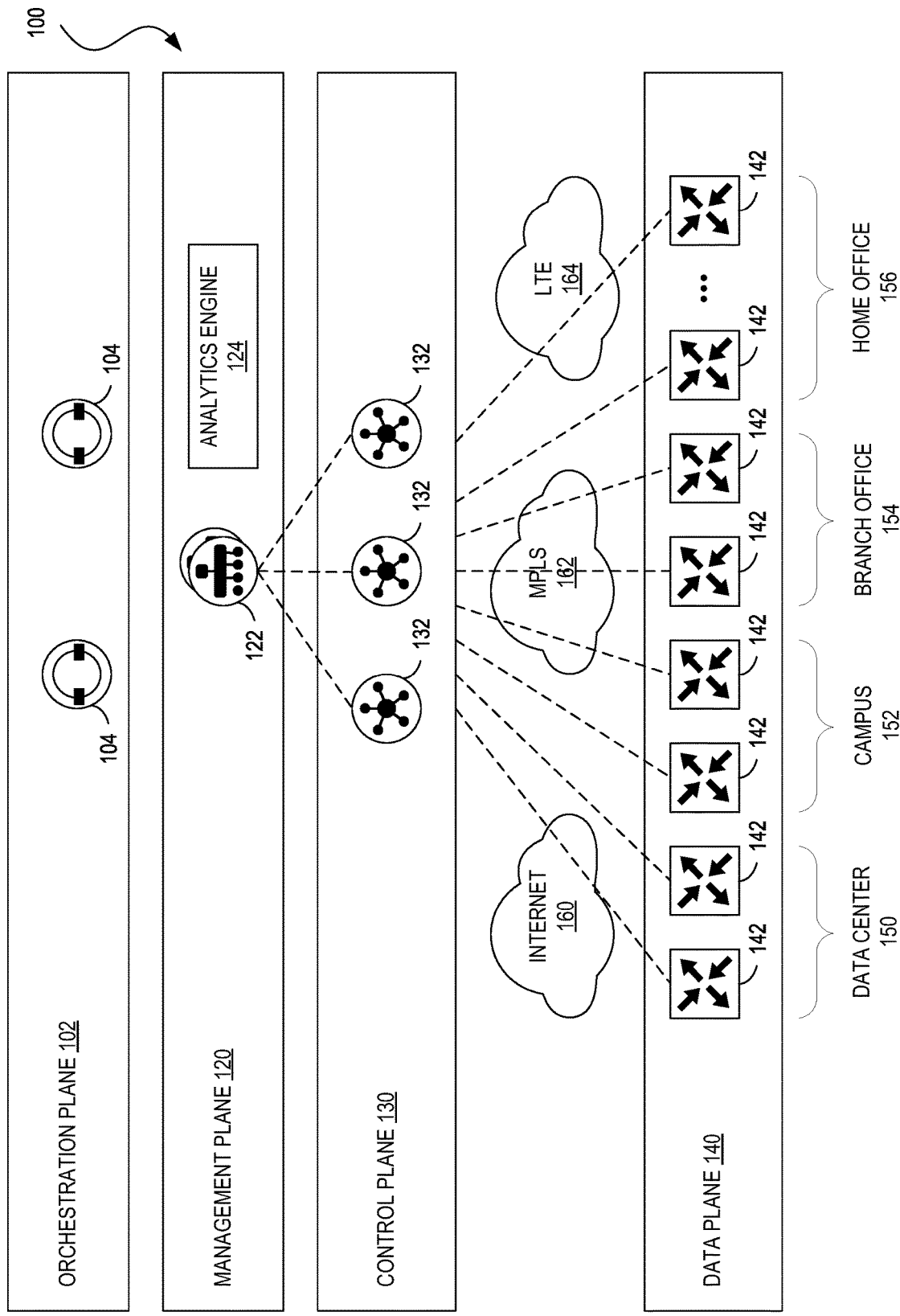
FIG. 1 illustrates an example of a high-level network architecture in accordance with some examples.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Disclosed herein are systems, methods, and computer-readable media for providing secure frame encryption as a service. An example method can include receiving, by a network device, a first request for encrypting a first media stream associated with a first endpoint; in response to the first request, obtaining a first encryption key for encrypting the first media stream associated with the first endpoint; receiving, from the first endpoint, a first plurality of media frames corresponding to the first media stream; encrypting each of the first plurality of media frames using the first encryption key to yield a first plurality of encrypted media frames; and packetizing the first plurality of encrypted media frames into a first plurality of data packets for transmission to a second endpoint.

An example system can include one or more processors and at least one computer-readable storage medium storing instructions which, when executed by the one or more processors, cause the one or more processors to receive a first request for encrypting a first media stream associated with a first endpoint; in response to the first request, obtain a first encryption key for encrypting the first media stream associated with the first endpoint; receive, from the first endpoint, a first plurality of media frames corresponding to the first media stream; encrypt each of the first plurality of media frames using the first encryption key to yield a first plurality of encrypted media frames; and packetize the first plurality of encrypted media frames into a first plurality of data packets for transmission to a second endpoint.

An example non-transitory computer-readable storage medium having stored therein instructions which, when executed by a processor, cause the processor to receive, by a network device, a first request for encrypting a first media stream associated with a first endpoint; in response to the first request, obtain a first encryption key for encrypting the first media stream associated with the first endpoint; receive, from the first endpoint, a first plurality of media frames corresponding to the first media stream; encrypt each of the first plurality of media frames using the first encryption key to yield a first plurality of encrypted media frames; and packetize the first plurality of encrypted media frames into a first plurality of data packets for transmission to a second endpoint.

Example Embodiments

A computing device can include devices such as a mobile phone, router, tablet computer, laptop computer, tracking device, wearable device (e.g., a smart watch, glasses, an XR device, etc.), Internet of Things (IoT) device, a vehicle (or a computing device of a vehicle), and/or another device used by a user to communicate over a wireless communications network. In some instances, a computing device can be referred to as user equipment (UE), such as when referring to a wireless device configured to communicate using 5G/New Radio (NR) or other telecommunications standard. In some examples, a computing device can be referred to as an endpoint.

In some cases, an endpoint can be configured to communicate with another endpoint using audio and/or video conferencing. For example, two or more endpoints can perform audio and/or video conferencing using CISCO WEBEX'. In some cases, audio and/or video streams may be vulnerable to attacks when travelling through unsecured networks. Further, implementing encryption algorithms can be burdensome or unfeasible if the endpoint does not have sufficient processing resources.

The present technology provides systems and techniques for securing audio and video streams by providing secure frame encryption as a service. For example, software-as-a-service (SaaS) is a software distribution model where applications hosted by remote servers are accessed by client devices (e.g., endpoints) over a network. In some examples, one or more of the secure frame encryption functions can be hosted on a network device such as an edge router. The network device can provide the secure frame encryption service to endpoints in the network by handling functions such as key management, encryption of media frames, and/or packetizing encrypted media frames. In some aspects, endpoints in a Software Defined Wide Area Network (SD-WAN) can request secure frame as a service from a centralized controller. In some examples, the controller can configure the network device (e.g., edge router) to perform secure frame as a service. In some cases, the controller can define the way to identify traffic that should be processed using secure frame as a service (e.g., IP address, MAC address, etc.).

In some aspects, the entity performing secure frame as a service can use a single encryption key to encrypt traffic from multiple associated endpoints. In other examples, the entity performing secure frame as a service can obtain metadata from one or more of the endpoints that can indicate whether the endpoint requires a unique encryption key or whether the encryption key can be shared with other endpoints.

As further described below, the disclosed technology provides systems, methods, and computer-readable media for providing secure frame encryption as a service. Examples will be described herein using a Secure Access Service Edge (SASE) architecture (e.g., Software Defined Wide Area Network (SD-WAN)) as an illustrative example. However, the systems and techniques are not limited to SASE environments and can be implemented using other network configurations such as cloud computing or cloud networking.

FIG. 1 illustrates an example of a network architecture 100 for implementing aspects of the present technology. An example of an implementation of the network architecture 100 is the Cisco® SDWAN architecture. However, one of ordinary skill in the art will understand that, for the network architecture 100 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively, or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each edge network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
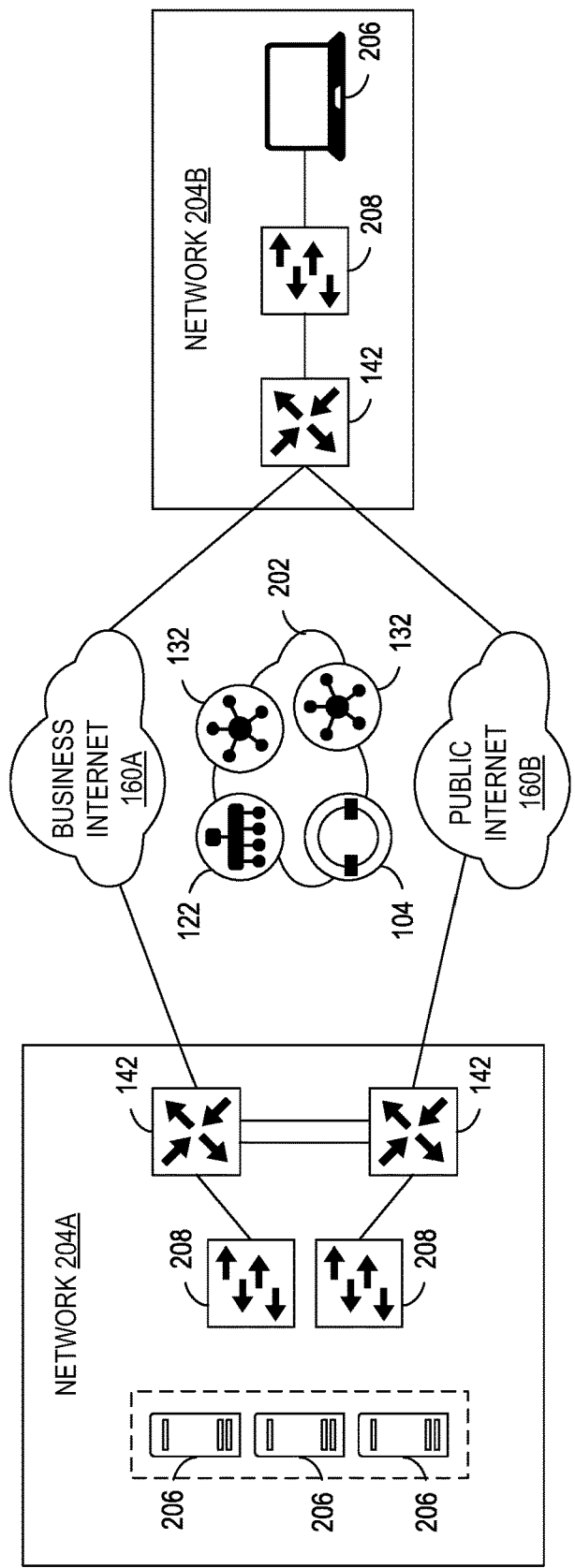
FIG. 2 illustrates an example of a network topology in accordance with some examples.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
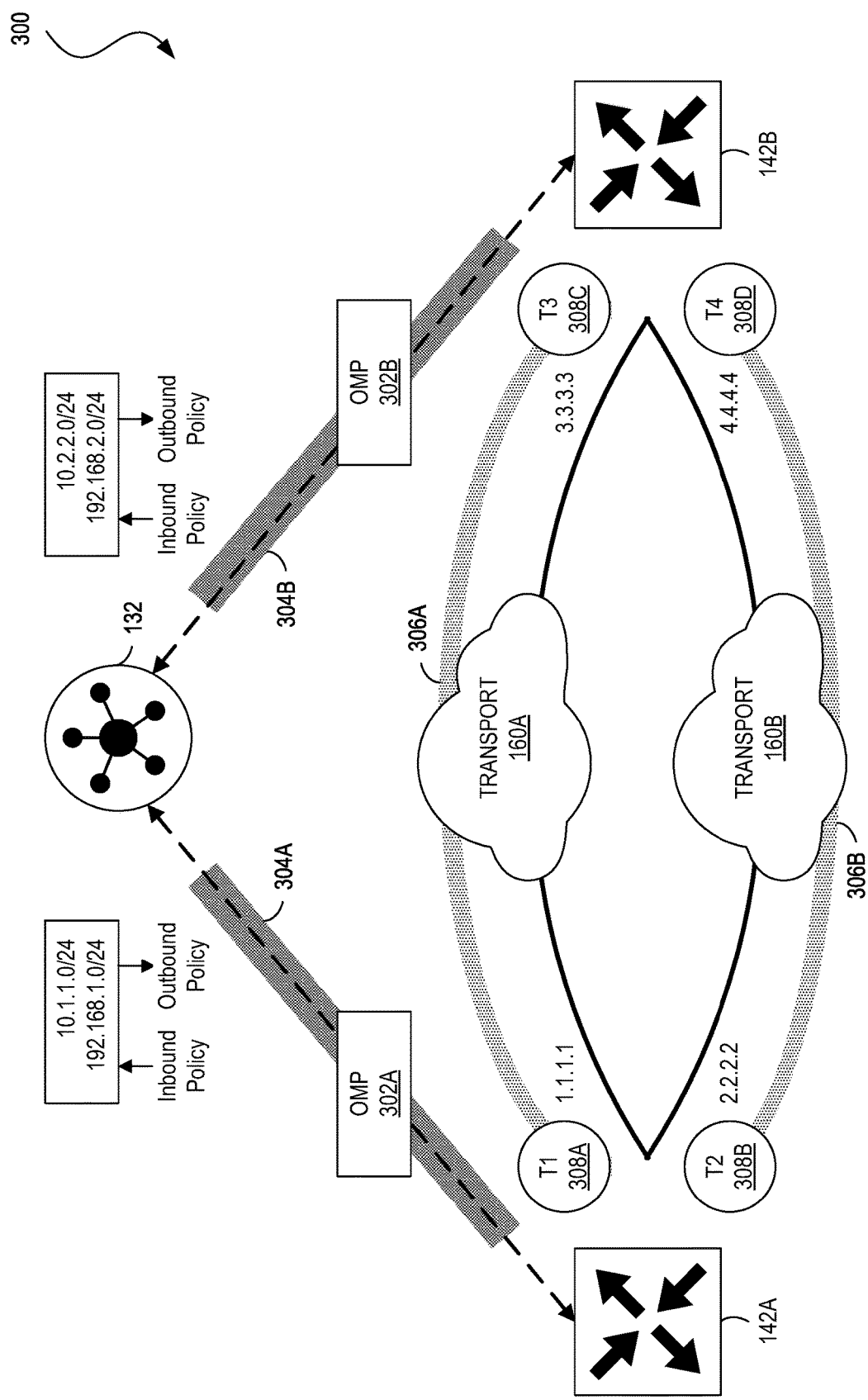
FIG. 3 illustrates an example of a diagram showing the operation of a protocol for managing an overlay network in accordance with some examples.

FIG. 3 illustrates an example of a diagram 300 showing the operation of an Overlay Management Protocol (OMP), which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:

OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
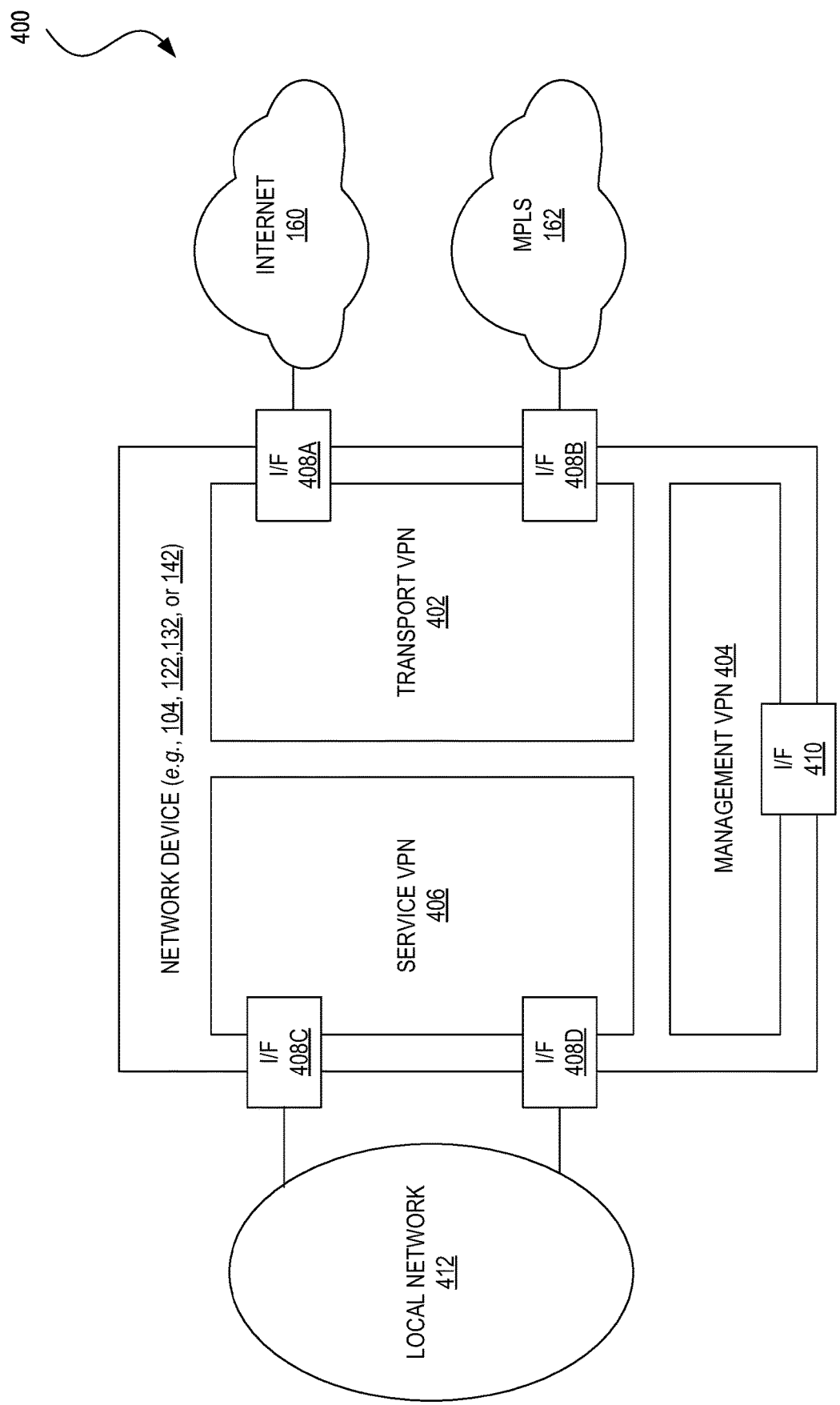
FIG. 4 illustrates an example of a diagram showing the operation of virtual private networks for segmenting a network in accordance with some examples.

FIG. 4 illustrates an example of a diagram 400 showing the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively, 410) are shown to be physical interfaces in this example, one of ordinary skill in the art will appreciate that the interfaces 410 in the transport and service VPNs can also be sub-interfaces instead.

As noted above, the present technology provides systems and techniques for securing audio and video streams by providing secure frame encryption as a service. Secure frame encryption was developed to address security vulnerabilities for audio and video streams in a multi-hop environment (e.g., including one or more media servers). That is, prior encryption algorithms were susceptible to attacks because content is accessible to the intermediate devices. Secure frame encryption provides an encryption algorithm in which intermediate devices can access metadata needed to route audio and/or video streams without having access to the media.

Implementation of the secure frame encryption algorithm includes numerous tasks that utilize processing resources. For example, the secure frame encryption algorithm includes encoding the media stream, performing key management, encrypting media frames, and packetizing the encrypted media frames. In some instances, an endpoint may not have the resources (e.g., hardware and/or software capabilities) to perform all of the functions for secure frame encryption. In addition, configuring individual endpoints to perform secure frame encryption may delay deployment.

To overcome these challenges, the present technology provides systems and techniques for providing secure frame encryption as a service. In some examples, one or more of the secure frame functions can be hosted on a network device such as an edge router. The network device can provide the secure frame encryption service to endpoints in the network by handling functions such as key management, encryption of media frames, and/or packetizing encrypted media frames.

Figure 5:
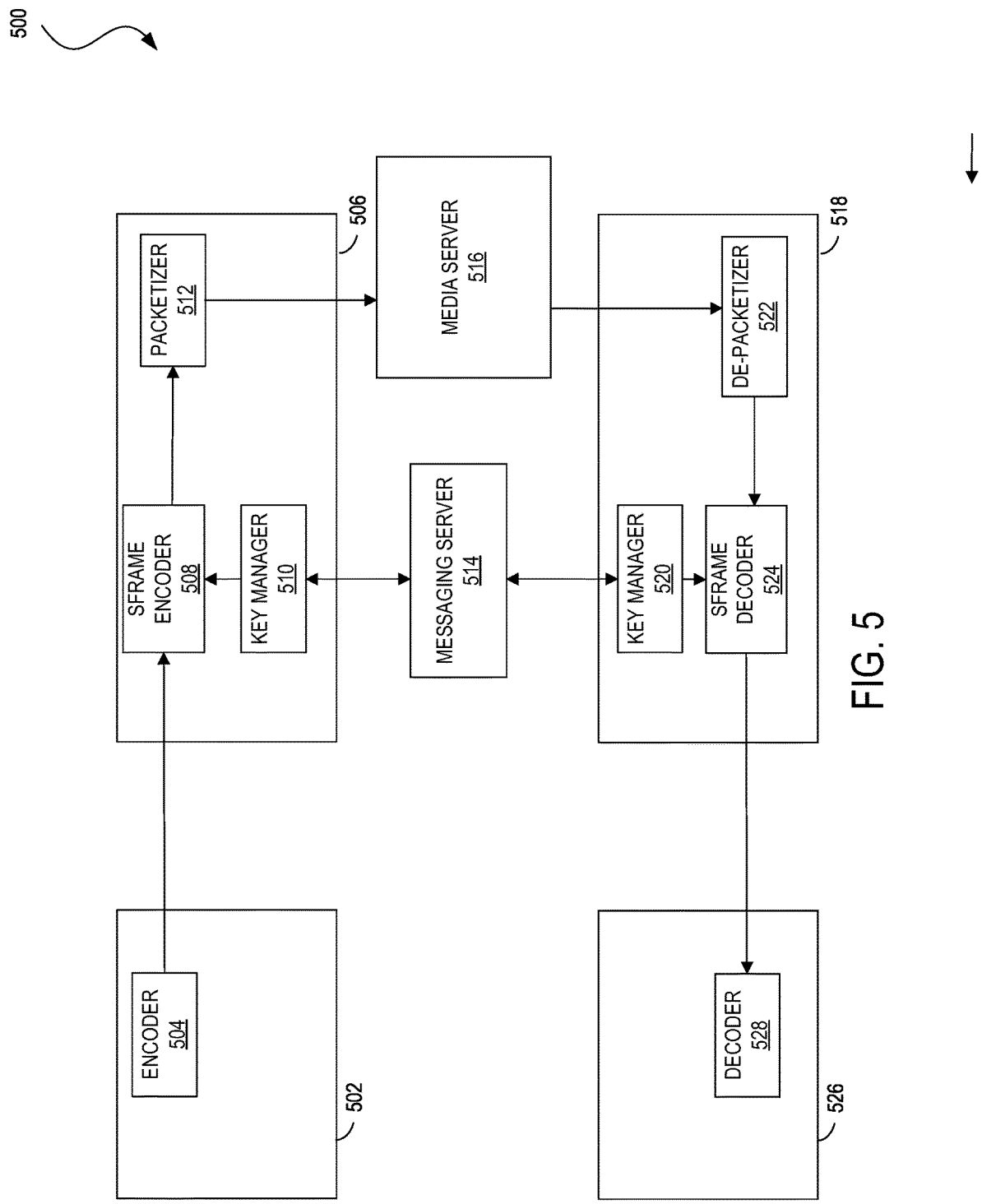
FIG. 5 illustrates an example of a network configuration in accordance with some examples.

FIG. 5 illustrates an example of a network architecture 500 for implementing aspects of the present technology. In some examples, network architecture 500 can include endpoint 502 and endpoint 526. In some aspects, endpoint 502 and endpoint 526 can be configured to communicate with each other via a multi-party conference call (e.g., perform audio and/or media conferencing). In some cases, endpoint 502 can be coupled to network device 506 that is configured to provide secure frame encryption as a service to endpoint 502. In some examples, endpoint 526 can be coupled to network device 518 that is configured to provide secure frame encryption as a service to endpoint 526. In some examples, network device 506 can include an edge router, a switch, a session border controller, a base station, a server (e.g., cloud-based server), or any other type of network device that can be configured to perform the operations described herein.

In some embodiments, network device 506 and/or network device 518 can include one or more modules (e.g., hardware and/or software) that can be configured to perform different functions associated with secure frame encryption. For instance, network device 506 can include a secure frame encoder 508, a key manager 510, and/or a packetizer 512, and network device 518 can include a secure frame decoder 524, a key manager 520, and/or a de-packetizer 522. As illustrated, network device 506 performs secure frame services associated with encrypting media frames transmitted by endpoint 502, and network device 518 performs secure frame services associated with decryption of media frames received by endpoint 518. Those skilled in the art will recognize that secure frame encryption and secure frame decryption functions are not exclusive and a network device (e.g., network device 506 and/or network device 518) can be configured to perform secure frame services associated with encryption and/or decryption.

In some aspects, endpoint 502 can include an encoder 504 that is configured to encode one or more media frames. For example, encoder 502 can include a video encoder configured to receive data from an input device (e.g., a camera) and to provide a corresponding encoded digital output signal. In some cases, media frames encoded by encoder 504 can be sent from endpoint 502 to network device 506 for secure frame encryption.

In some examples, key manager 510 can store or derive one or more encryption keys that can be used to encrypt media frames from endpoint 502. In some aspects, key manager 520 can store or derive one or more decryption keys that can be used to decrypt media frames from endpoint 502. In some cases, key manager 510 and key manager 520 can communicate using messaging server 514. For example, key manager 510 and key manager 520 can exchange one or more messages indicating a key for encrypting and decrypting one or more media frames. In some aspects, encryption keys stored by key manager 510 and key manager 520 can be associated with a key identifier that is included in a secure frame header. In some examples, key manager 510 and key manager 520 can use messaging server to communicate or identify an encryption key that is associated with a key identifier.

In some cases, secure frame encoder 508 can obtain an encryption key from key manager 510 and perform secure frame encryption on one or more media packets received from endpoint 502. In some examples, secure frame encoder 508 can extract media metadata from the encoded frame buffer(s) (e.g., from encoder 504) and place the metadata in a real-time transport protocol (RTP) header extension. In some aspects, secure frame encoder 508 can form a secure frame header that can include one or more fields. For example, the secure frame header can include an encryption key identifier field, a frame counter field, an encryption key length field, and/or any other field. In some cases, secure frame encoder 508 can encrypt the media frames from endpoint 502 using an authenticated encryption (AE) algorithm, an authenticated encryption with associated data (AEAD) algorithm, and/or any other suitable encryption algorithm. In some examples, the secure frame header can be provided as additional authenticated data (AAD) to the AEAD algorithm with frame metadata appended.

In some embodiments, the encrypted payload from the media frames can be sent from secure frame encoder 508 to packetizer 512. In some aspects, packetizer 512 can construct or assemble one or more media packets using a real-time transport protocol (RTP). In some examples, packetizer 512 can include metadata (e.g., extracted from the encoded media frames) in an RTP header extension. In some cases, the metadata can include information that can be used by media server 516 for routing the packet to network device 518 and/or endpoint 526. In some examples, media server 516 can access media metadata needed to make forwarding decisions without having access to encrypted media packets.

In some aspects, media server 516 can forward the encrypted media packets to network device 518. As noted above, network device 518 can be configured to provide secure frame as a service to endpoint 526. In some examples, network device 518 can include de-packetizer 522 which can be configured to unpack the encrypted media packets. In some cases, network device 518 can include secure frame decoder 524 which can be configured to decrypt the encrypted payload (e.g., using decryption key from key manager 520). In some examples, secure frame decoder 525 can send the unencrypted media frames to endpoint 526. In some aspects, endpoint 526 can use decoder 528 to decode the encoded media frames.

Figure 6:
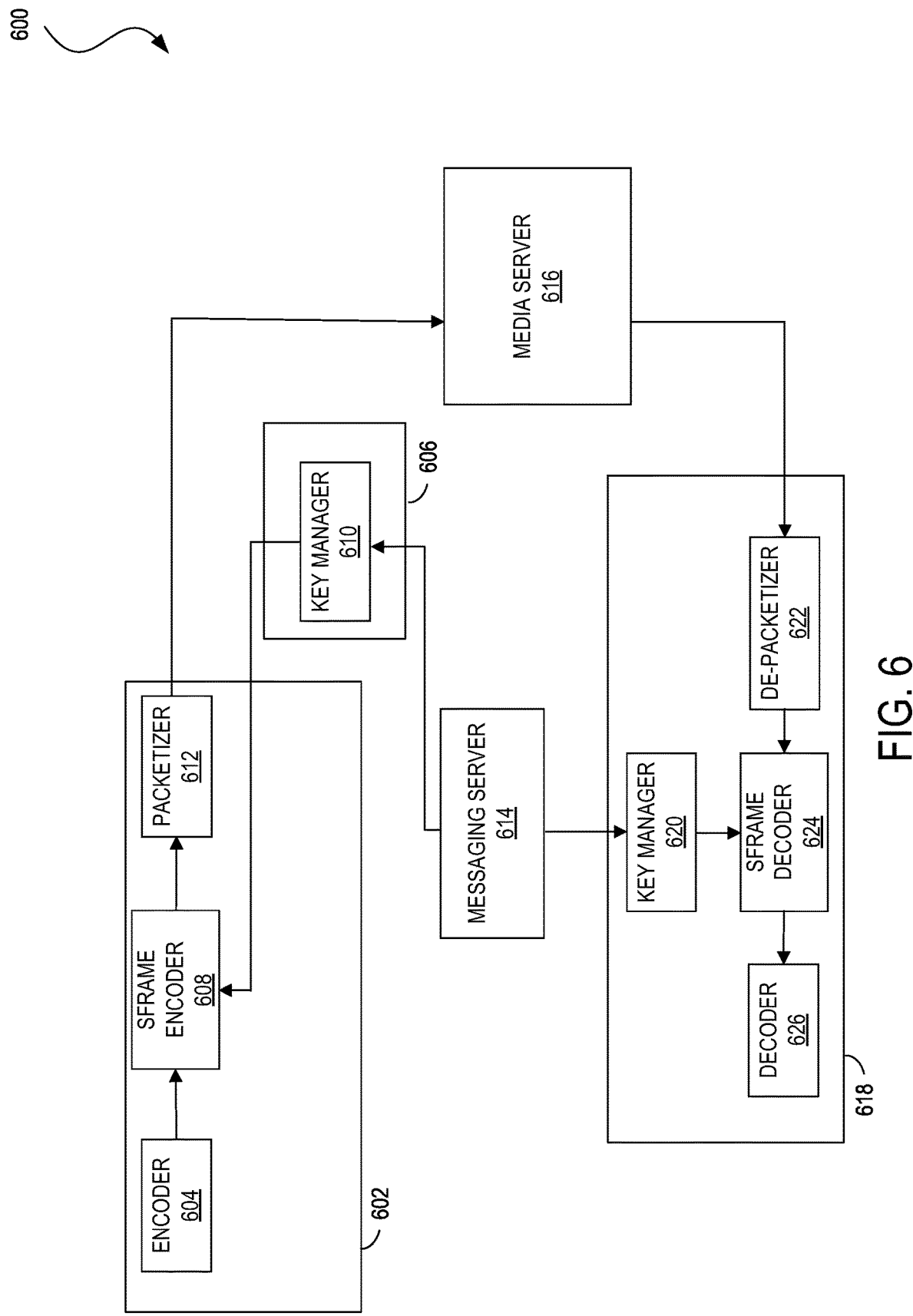
FIG. 6 illustrates another example of a network configuration in accordance with some examples.

FIG. 6 illustrates an example of a network architecture 600 for implementing aspects of the present technology. In some examples, network architecture 600 can include endpoint 602 and endpoint 618. In some aspects, endpoint 602 and endpoint 618 can be configured to communicate with each other via a multi-party conference call (e.g., perform audio and/or media conferencing). In some cases, endpoint 602 and endpoint 618 can be configured to implement some or all of the functions associated with secure frame encryption. For example, endpoint 618 is configured to perform secure frame encryption locally and endpoint 602 is coupled to network device 610 that can be configured to implement secure frame encryption as a service.

As illustrated, endpoint 602 is coupled to network device 606 that includes key manager 610. In some aspects, key manager 610 can provide the encryption key management services associated with secure frame encryption. In some cases, key manager 610 can store or derive one or more encryption keys that can be used to encrypt media frames from endpoint 602. In some examples, key manager 610 can establish a secure communication session with key manager 620 (e.g., via messaging server 614) in order to provide data indicating and/or identifying an encryption key for use by secure frame encoder 608 and/or secure frame decoder 624.

In some examples, endpoint 602 can include encoder 604, secure frame encoder 608, and/or packetizer 612. As noted with respect to network architecture 500, secure frame encoder 608 can be configured to obtain an encryption key from key manager 610 and perform secure frame encryption on one or more media packets received from encoder 604. The encrypted payload from secure frame encoder 608 can be sent to packetizer 612. In some examples, packetizer 612 can implement a real-time transport protocol (RTP). In some cases, the encrypted media packets can be sent to endpoint 618 via media server 616. In some examples, media server 616 can include a selective forwarding unit (SFU).

In some embodiments, media server 616 can route the secure frame encrypted packets to endpoint 518. In some aspects, endpoint 518 can include de-packetizer 622, secure frame decoder 624, key manager 620, and/or decoder 626 which can be configured to receive and decrypt the secure frame media packets. In some embodiments, endpoint 518 can receive secure frame as a service from a network device (not illustrated) that can be configured to perform all or a portion of the functions associated with secure frame encryption.

Figure 7:
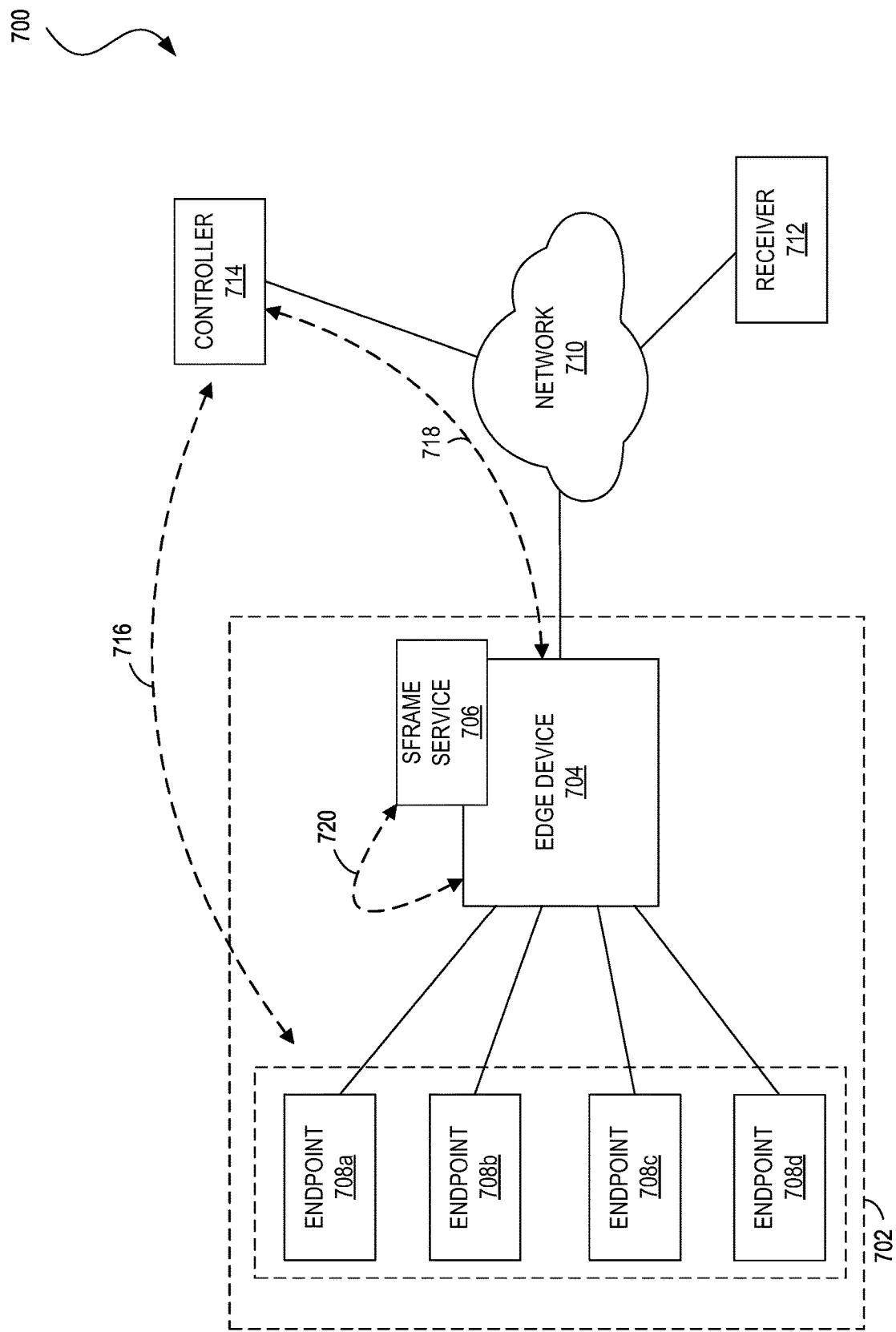
FIG. 7 illustrates another example of a network configuration in accordance with some examples.

FIG. 7 illustrates an example of a network architecture 700 for implementing aspects of the present technology. In some aspects, network architecture 700 can include network site 702 having an edge device 704 (e.g., edge device 204*a*) and endpoints 708*a*, 708*b*, 708*c*, and 708*d* (collectively "endpoints 708"). In some configurations, edge device 704 and/or endpoints 708 can communicate with a controller 714 (e.g., controller 132) via network 710.

In some examples, endpoints 708 can send a request 716 to controller 714 (e.g., controller 132) for secure frame as a service 706. In some embodiments, request 716 to controller 714 can include application programming interface (API) calls. In some aspects, controller 714 can process request 716 and communicate 718 with edge device 704 to enable secure frame as a service 706. In some cases, controller 714 can configure edge device 704 to identify network traffic that should be handled by secure frame as a service 706. For example, controller 714 can configure edge device 704 to implement secure frame as a service 706 for network traffic corresponding to a certain application, protocol, endpoint, etc.

In some examples, edge device 704 can communicate 720 with secure frame as a service 706 in order to enable secure frame capabilities for one or more of endpoints 708. In some aspects, edge device 704 can implement rules or policies for identifying network traffic that corresponds to secure frame as a service 706. In some embodiments, edge device 704 and/or secure frame as a service 706 can be configured to perform one or more of the secure frame encryption functions described with respect to network device 506.

In some aspects, one or more media frames sent by endpoints 708 can be encrypted by secure frame as a service 706 and sent to receiver 712 (e.g., via network 710). In some examples, one or more media frames directed to endpoints 708 can be processed (e.g., de-packetized, decrypted, etc.) by secure frame as a service 706 and the unencrypted media frames can be sent from edge device 704 to endpoints 708.

Figure 8:
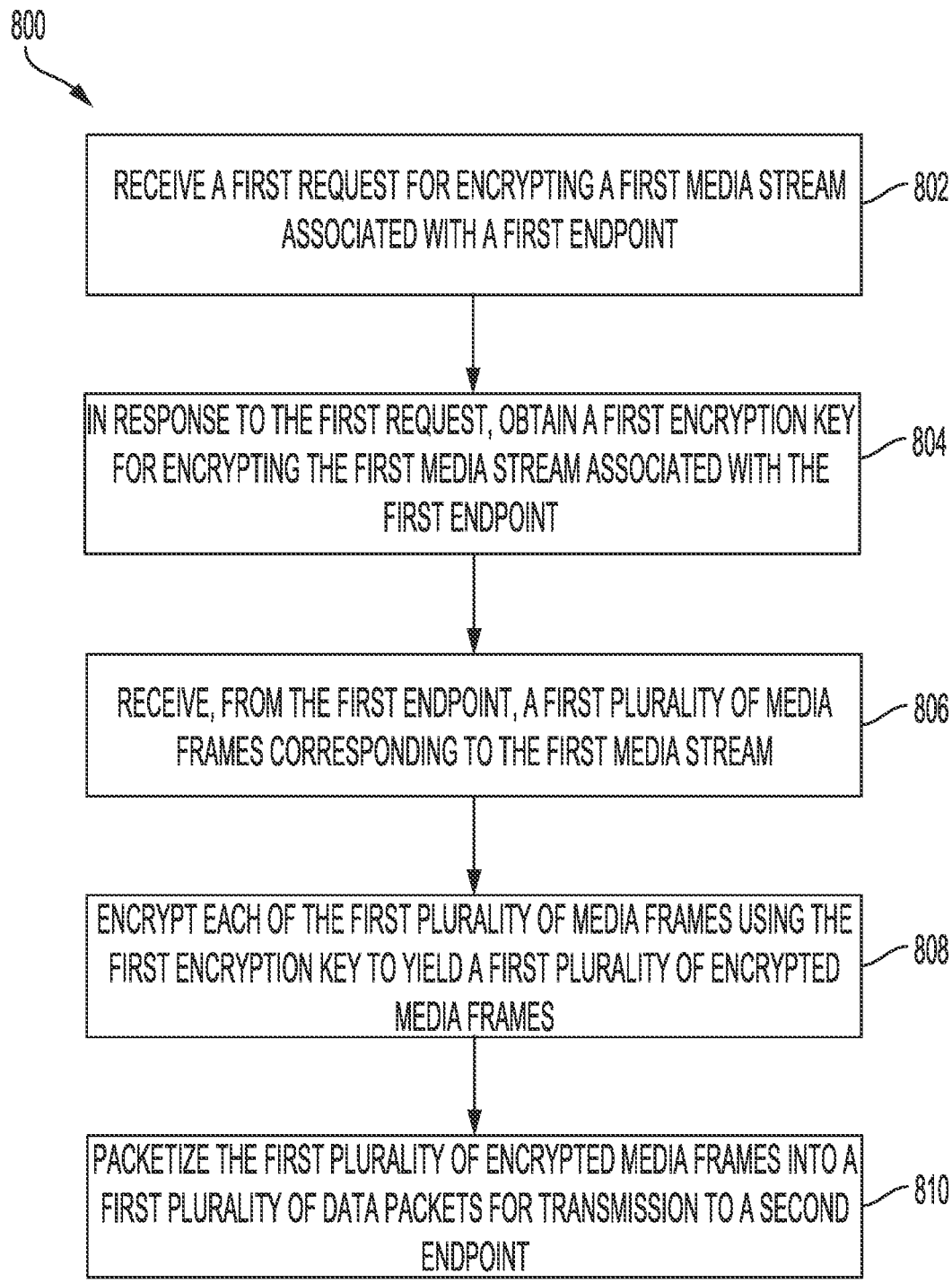
FIG. 8 illustrates an example of a flowchart showing a method for performing secure frame encryption as a service.

FIG. 8 illustrates an example method 800 for performing secure frame encryption as a service. At block 802, the method 800 includes receiving a first request for encrypting a first media stream associated with a first endpoint. In some examples, the first request is received from at least one of a software defined wide area network (SD-WAN) controller, a Secure Access Service Edge (SASE) controller, a session border controller, and a cloud edge device. In some aspects, the network device can correspond to at least one of an edge router, a switch, a session border controller, or a base station. For instance, controller 714 can send a communication 718 to controller 704 to enable secure frame as a service 706 for one or more of endpoints 708.

At block 804, the method 800 includes obtaining a first encryption key for encrypting the first media stream associated with the first endpoint in response to the first request. For example, network device 506 can obtain, derive, or determine an encryption key using key manager 510. In some aspects, the encryption key can be used to encrypt a media stream associated with endpoint 502.

At block 806, the method 800 includes receiving, from the first endpoint, a first plurality of media frames corresponding to the first media stream. For instance, network device 506 can receive a plurality of media frames corresponding to a media stream from endpoint 502.

At block 808, the method 800 includes encrypting each of the first plurality of media frames using the first encryption key to yield a first plurality of encrypted media frames. For example, secure frame encoder 508 can encrypt the media frames from endpoint 502 using an encryption key from key manager 510.

At block 810, the method 800 includes packetizing the first plurality of encrypted media frames into a first plurality of data packets for transmission to a second endpoint. For instance, packetizer 512 can packetize the encrypted payload from secure frame encoder 508 and send the data packets to endpoint 526 (e.g., via media server 516).

In some aspects, the method can include receiving a second request for encrypting a second media stream associated with a second endpoint. In some embodiments, the first endpoint and the second endpoint can be part of a same edge environment. For instance, the first endpoint and the second endpoint can be part of same software defined wide area network (SD-WAN). In some aspects, the first request can be associated with endpoint 708*a* and the second request can be associated with endpoint 708*b*, which are part of same network site 702.

In some embodiments, the method can include determining, based on metadata associated with the first endpoint and the second endpoint, that the first endpoint and the second endpoint can share the first encryption key; receiving, from the second endpoint, a second plurality of media frames corresponding to the second media stream; and encrypting each of the second plurality of media frames using the first encryption key to yield a second plurality of encrypted media frames. For example, secure frame as service 706 and/or edge device 704 can determine (e.g., based on metadata) that endpoint 708*a* and endpoint 708*b* can share an encryption key. In some aspects, secure frame as a service 706 and/or edge device 704 can perform secure frame encryption on the respective media frames from endpoint 708a and endpoint 708b using a same encryption key.

In some cases, the method can include determining, based on metadata associated with the second endpoint, that the second endpoint is requesting a unique encryption key; and obtaining a second encryption key for encrypting the second media stream associated with the second endpoint. For instance, edge device 704 and/or secure frame as a service 706 can determine that endpoint 708b is requesting a unique encryption key and obtain (e.g., derive, determine, calculate) a second encryption key for encrypting the media stream from endpoint 708b.

In some aspects, the method can include determining that the first media stream and the second media stream are directed to a same destination endpoint; and aggregating a plurality of data packets corresponding to a plurality of encrypted media frames associated with the first media stream and the second media stream. For example, edge device 704 and/or secure frame as a service 706 can determine that the media stream from endpoint 708a and the media stream from endpoint 708b are both directed to receiver 712. In some cases, edge device 704 and/or secure frame as a service 706 can aggregate the data packets corresponding to the two media streams.

In some embodiments, the method can include receiving, from a media server, a second plurality of data packets associated with a received media stream directed to the first endpoint; processing the second plurality of data packets to yield one or more encrypted media frames; obtaining a decryption key for decrypting the one or more encrypted media frames; decrypting the one or more encrypted media frames using the decryption key to yield a decrypted media stream; and sending the decrypted media stream to the first endpoint. For instance, edge device 704 and/or secure frame as a service 706 can receive a media stream directed to endpoint 708a. In some aspects, edge device 704 and/or secure frame as a service 706 can implement functions for receiving and processing the received media stream as described with respect to network device 518.

Figure 9:
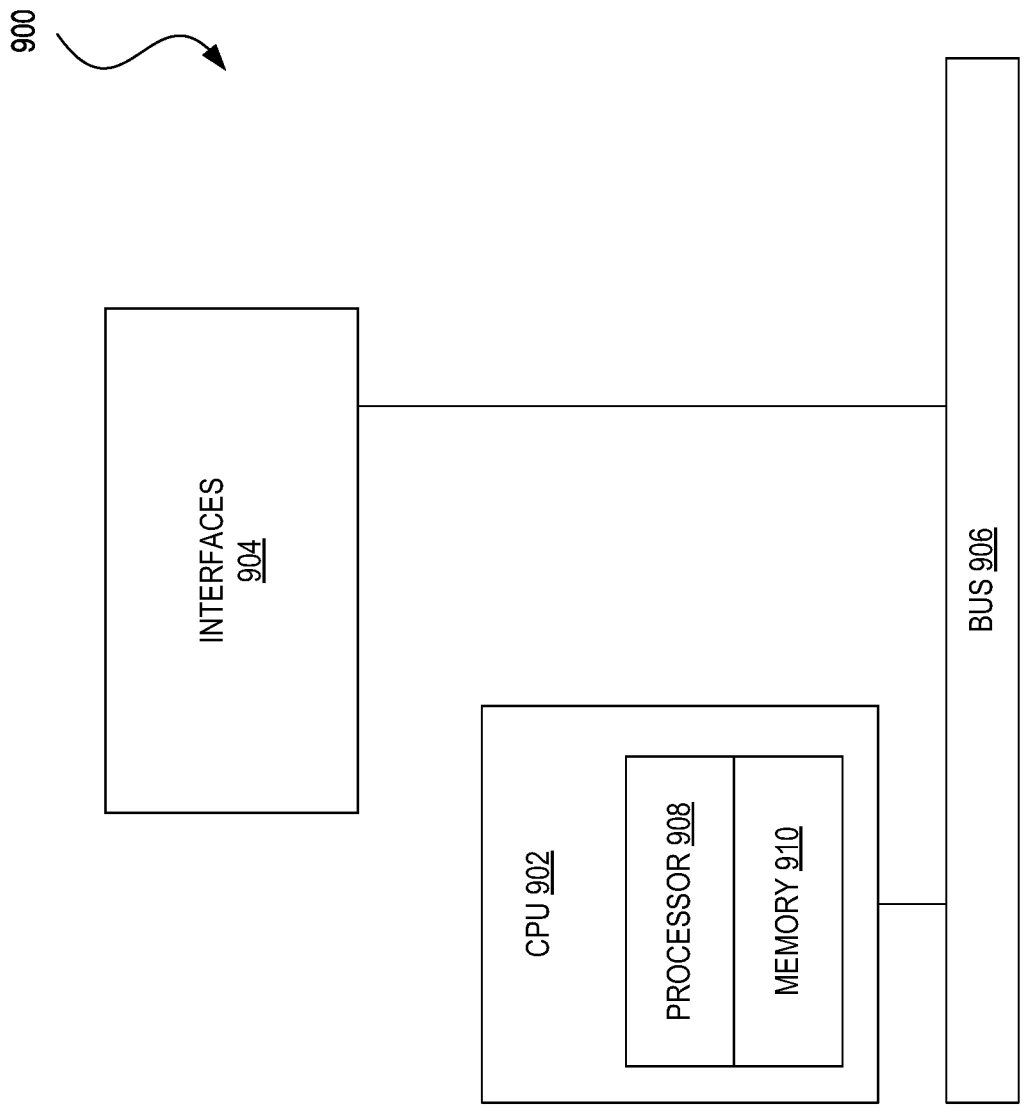
FIG. 9 illustrates an example of a network device in accordance with some examples.

FIG. 9 illustrates an example of a network device 900 (e.g., switch, router, network appliance, etc.). The network device 900 can include a master central processing unit (CPU) 902, interfaces 904, and a bus 906 (e.g., a PCI bus). When acting under the control of appropriate software or firmware, the CPU 902 can be responsible for executing packet management, error detection, and/or routing functions. The CPU 902 preferably accomplishes all these functions under the control of software including an operating system and any appropriate applications software. The CPU 902 may include one or more processors 908 such as a processor from the Motorola family of microprocessors or the MIPS family of microprocessors. In an alternative embodiment, the processor 908 can be specially designed hardware for controlling the operations of the network device 900. In an embodiment, a memory 910 (such as non-volatile RAM and/or ROM) can also form part of the CPU 902. However, there are many different ways in which memory could be coupled to the system.

The interfaces 904 can be provided as interface cards (sometimes referred to as line cards). The interfaces 904 can control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 904 may include ports appropriate for communication with the appropriate media. In some cases, the interfaces 904 may also include an independent processor and, in some instances, volatile RAM. The independent processors may control communication intensive tasks such as packet switching, media control, and management. By providing separate processors for the communication intensive tasks, the interfaces 904 may allow the CPU 902 to efficiently perform routing computations, network diagnostics, security functions, and so forth.

Although the system shown in FIG. 9 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 900.

Regardless of the network device's configuration, it may employ one or more memories or memory modules (including the memory 910) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 10:
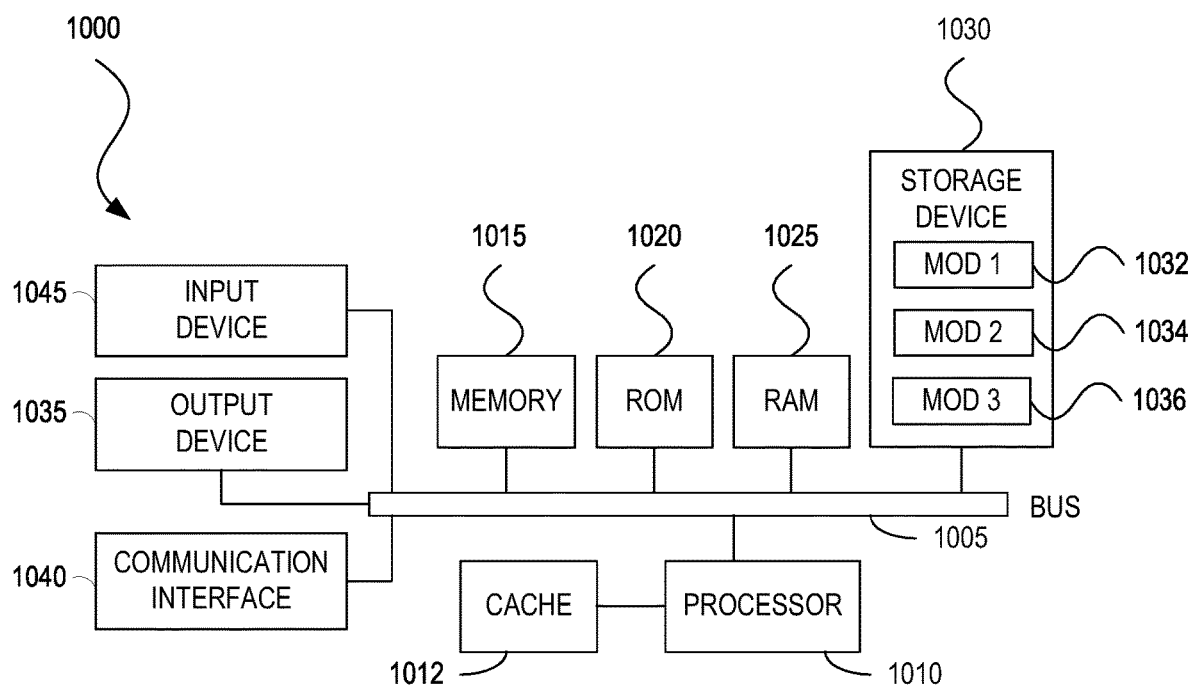
FIG. 10 illustrates an example computing device in accordance with some examples.

FIG. 10 illustrates an example of a bus computing system 1000 wherein the components of the system are in electrical communication with each other using a bus 1005. The computing system 1000 can include a processing unit (CPU or processor) 1010 and a system bus 1005 that may couple various system components including the system memory 1015, such as read only memory (ROM) 1020 and random access memory (RAM) 1025, to the processor 1010. The computing system 1000 can include a cache 1012 of high-speed memory connected directly with, in close proximity to, or integrated as part of the processor 1010. The computing system 1000 can copy data from the memory 1015, ROM 1020, RAM 1025, and/or storage device 1030 to the cache 1012 for quick access by the processor 1010. In this way, the cache 1012 can provide a performance boost that avoids processor delays while waiting for data. These and other modules can control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in the storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing system 1000, an input device 1045 can represent any number of input mechanisms, such as a microphone for speech, a touch-protected screen for gesture or graphical input, key-board, mouse, motion input, speech and so forth. An output device 1035 can also be one or more of a number of output mechanisms known to those of skill in the art. In some instances, multimodal systems can enable a user to provide multiple types of input to communicate with the computing system 1000. The communications interface 1040 can govern and manage the user input and system output. There may be no restriction on operating on any particular hardware arrangement and therefore the basic features here may easily be substituted for improved hardware or firmware arrangements as they are developed.

The storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1030 can include the software modules 1032, 1034, 1036 for controlling the processor 1010. Other hardware or software modules are contemplated. The storage device 1030 can be connected to the system bus 1005. In some embodiments, a hardware module that performs a particular function can include a software component stored in a computer-readable medium in connection with the necessary hardware components, such as the processor 1010, bus 1005, output device 1035, and so forth, to carry out the function.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
    receiving, by a network device, a first request for encrypting a first media stream associated with a first endpoint;
    configuring by the network device the first endpoint to perform secure frame encryption, wherein the secure frame encryption includes an encryption algorithm in which the first endpoint has access to metadata of the first media stream to route the first media stream to a second endpoint without having access to media of the first media stream;
    obtaining, by the first endpoint, a first encryption key for encrypting the first media stream associated with the first endpoint;
    receiving, from the first endpoint, a first plurality of media frames corresponding to the first media stream;
    encrypting each of the first plurality of media frames using the first encryption key to yield a first plurality of encrypted media frames;
    packetizing the first plurality of encrypted media frames into a first plurality of data packets for transmission to the second endpoint; and
    forwarding, by the first endpoint without having access to the media of the first media stream to second endpoint, the first plurality of data packets.

2. The method of claim 1, wherein the first request is received from at least one of a software defined wide area network (SD-WAN) controller, a Secure Access Service Edge (SASE) controller, a session border controller, and a cloud edge device.

3. The method of claim 1, wherein the network device corresponds to at least one of an edge router, a switch, a session border controller, or a base station.

4. The method of claim 1, further comprising:
    receiving a second request for encrypting a second media stream associated with a second endpoint.

5. The method of claim 4, further comprising:
determining, based on metadata associated with the first endpoint and the second endpoint, that the first endpoint and the second endpoint can share the first encryption key;
receiving, from the second endpoint, a second plurality of media frames corresponding to the second media stream; and
encrypting each of the second plurality of media frames using the first encryption key to yield a second plurality of encrypted media frames.

6. The method of claim 4, further comprising:
determining, based on metadata associated with the second endpoint, that the second endpoint is requesting a unique encryption key; and
obtaining a second encryption key for encrypting the second media stream associated with the second endpoint.

7. The method of claim 4, further comprising:
determining that the first media stream and the second media stream are directed to a same destination endpoint; and
aggregating a plurality of data packets corresponding to a plurality of encrypted media frames associated with the first media stream and the second media stream.

8. The method of claim 1, further comprising:
receiving, from a media server, a second plurality of data packets associated with a received media stream directed to the first endpoint;
processing the second plurality of data packets to yield one or more encrypted media frames;
obtaining a decryption key for decrypting the one or more encrypted media frames;
decrypting the one or more encrypted media frames using the decryption key to yield a decrypted media stream; and
sending the decrypted media stream to the first endpoint.

9. A system comprising:
one or more processors; and
at least one non-transitory computer-readable storage medium having stored thereon instructions which, when executed by the one or more processors, cause the one or more processors to:
receive, by a network device, a first request for encrypting a first media stream associated with a first endpoint;
configuring by the network device, the first endpoint to perform secure frame encryption, wherein the secure frame encryption includes an encryption algorithm in which the first endpoint has access to metadata of the first media stream to route the first media stream to a second endpoint without having access to media of the first media stream;
obtain, by the first endpoint, a first encryption key for encrypting the first media stream associated with the first endpoint;
receive, from the first endpoint, a first plurality of media frames corresponding to the first media stream;
encrypt each of the first plurality of media frames using the first encryption key to yield a first plurality of encrypted media frames;
packetize the first plurality of encrypted media frames into a first plurality of data packets for transmission to a second endpoint; and
forward, by the first endpoint without having access to the media of the first media stream to second endpoint, the first plurality of data packets.

10. The system of claim 9, wherein the first request is received from at least one of a software defined wide area network (SD-WAN) controller, a Secure Access Service Edge (SASE) controller, a session border controller, and a cloud edge device.

11. The system of claim 9, wherein the first request is received by at least one of an edge router, a switch, a session border controller, or a base station.

12. The system of claim 9, the at least one non-transitory computer-readable storage medium storing instructions which, when executed by the one or more processors, cause the one or more processors to:
receive a second request for encrypting a second media stream associated with a second endpoint.

13. The system of claim 12, the at least non-transitory one computer-readable storage medium storing instructions which, when executed by the one or more processors, cause the one or more processors to:
determine, based on metadata associated with the first endpoint and the second endpoint, that the first endpoint and the second endpoint can share the first encryption key;
receive, from the second endpoint, a second plurality of media frames corresponding to the second media stream; and
encrypt each of the second plurality of media frames using the first encryption key to yield a second plurality of encrypted media frames.

14. The system of claim 12, the at least one non-transitory computer-readable storage medium storing instructions which, when executed by the one or more processors, cause the one or more processors to:
determine, based on metadata associated with the second endpoint, that the second endpoint is requesting a unique encryption key; and
obtain, from a server, a second encryption key for encrypting the second media stream associated with the second endpoint.

15. The system of claim 12, the at least non-transitory one computer-readable storage medium storing instructions which, when executed by the one or more processors, cause the one or more processors to:
determine that the first media stream and the second media stream are directed to a same destination endpoint; and
aggregate a plurality of data packets corresponding to a plurality of encrypted media frames associated with the first media stream and the second media stream.

16. The system of claim 9, the at least non-transitory one computer-readable storage medium storing instructions which, when executed by the one or more processors, cause the one or more processors to:
receive, from a media server, a second plurality of data packets associated with a received media stream directed to the first endpoint;
process the second plurality of data packets to yield one or more encrypted media frames;
obtain a decryption key for decrypting the one or more encrypted media frames;
decrypt the one or more encrypted media frames using the decryption key to yield a decrypted media stream; and
send the decrypted media stream to the first endpoint.

17. A non-transitory computer-readable storage medium having stored thereon instructions which, when executed by one or more processors, cause the one or more processors to:
- receive, by a network device, a first request for encrypting a first media stream associated with a first endpoint;
- configuring by the network device, the first endpoint to perform secure frame encryption, wherein the secure frame encryption includes an encryption algorithm in Which the first endpoint has access to metadata of the first media stream to route the first media stream to a second endpoint without having access to media of the first media stream;
- obtain, by the first endpoint, a first encryption key for encrypting the first media stream associated with the first endpoint;
- receive, from the first endpoint, a first plurality of media frames corresponding to the first media stream;
- encrypt each of the first plurality of media frames using the first encryption key to yield a first plurality of encrypted media frames;
- packetize the first plurality of encrypted media frames into a first plurality of data packets for transmission to a second endpoint; and
- forward, by the first endpoint without having access to the media of the first media stream to second endpoint, the first plurality of data packets.

18. The non-transitory computer-readable storage medium of claim 17, wherein the first request is received from at least one of a software defined wide area network (SD-WAN) controller, a Secure Access Service Edge (SASE) controller, a session border controller, and a cloud edge device.

19. The non-transitory computer-readable storage medium of claim 17, wherein the network device corresponds to at least one of an edge router, a switch, a session border controller, or a base station.

20. The non-transitory computer-readable storage medium of claim 17, comprising instructions which, when executed by one or more processors, cause the one or more processors to:
- receive a second request for encrypting a second media stream associated with a second endpoint.

* * * * *